R. B. COAR.
PIPE JOINT.
No. 103,567.  Patented May 31, 1870.
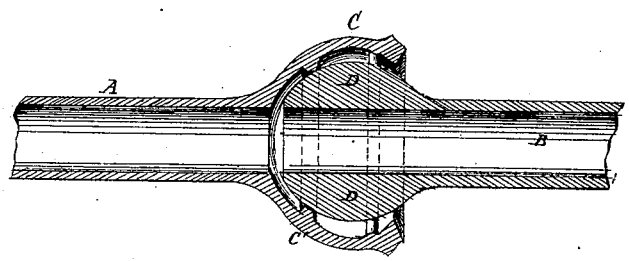
Witnesses:
A. W. Almqvist
L. S. Mabee
Inventor:
R. B. Coar
per Munn & Co
Attorneys.

United States Patent Office.

ROBERT B. COAR, OF JERSEY CITY, NEW JERSEY.

Letters Patent No. 103,567, dated May 31, 1870.

IMPROVEMENT IN PIPE-JOINTS.

The Schedule referred to in these Letters Patent and making part of the same

*To all whom it may concern:*

Be it known that I, ROBERT B. COAR, of Jersey City, in the county of Hudson and State of New Jersey, have invented a new and useful Improvement in Pipe-Joint; and I do hereby declare that the following is a full, clear, and exact description thereof, which will enable others skilled in the art to make and use the same, reference being had to the accompanying drawing forming part of this specification.

The figure is a section of a portion of pipe illustrating my improved pipe-joint.

My invention has for its object to furnish an improved pipe-joint, which shall be so constructed that should the joint be found to leak the water may be drawn off and the joint packed with soft metal from the inside of the pipe; and It consists in the pipe-joint constructed as hereinafter more fully described.

A and B represent the contiguous ends of two adjacent lengths of pipe.

Upon the end of the one length, as A, is formed a bell-shaped mouth, C, and upon the end of the other pipe, as B, is formed a convex spigot, D, fitting into the bell C.

The interior of the spigot D may be made straight or concave, as may be desired or convenient.

Upon the inner surface of the inner part of the bell C is formed a circular projection, $c'$, against which the forward part of the convex spigot D may strike when the two lengths of pipe are put together, and which serves as a stop to the soft metal packing as it is tamped into the space between the spigot D and bell C, from the outside of the pipe.

By this construction, the lengths are adjusted in line with each other, or at an angle, as may be required.

The soft metal packing is then tamped into the joint from the outside of the pipe, the projection $c'$ preventing it from being forced any further in.

If, after the pipe has been laid, it is found that any of the joints leak, the water may be drawn or pumped from the pipe, and the leaky joint packed by tamping the soft metal into it from the interior of the pipe.

The projection $c'$ may be formed upon the forward part of the convex spigot D, if desired, it being entirely immaterial upon which part it is formed so long as it serves as a step to the packing and leaves a space to receive packing, when required for the interior of the pipe.

Having thus described my invention,

I claim as new and desire to secure by Letters Patent—

The circular rib $c'$, arranged upon the interior of a bell-mouthed pipe-end, so as to form an interior space for soft metal or other packing, as and for the purpose described.

The above specification of my invention signed by me this 15th day of March, 1870.

ROBERT B. COAR.

Witnesses:
  GEO. W. MABEE,
  JAMES T. GRAHAM.